Figure 1:
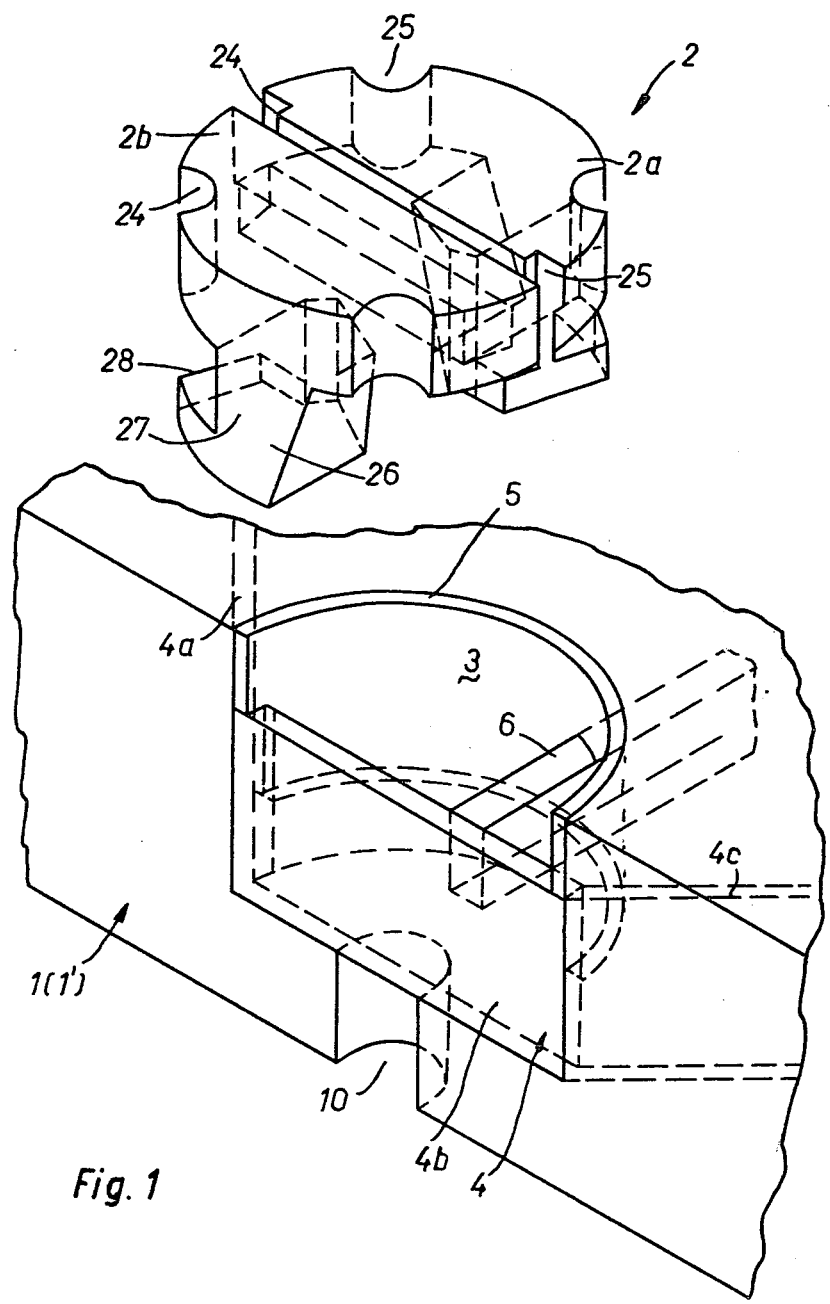

United States Patent [19]

Ruckstuhl

[11] 4,362,426

[45] Dec. 7, 1982

[54] ROAD SURFACE COMPRISING INDIVIDUAL INTERCONNECTED ELEMENTS

[76] Inventor: Willi Ruckstuhl, Augwilerstr. 43, Kloten, Switzerland

[21] Appl. No.: 261,212

[22] PCT Filed: Aug. 29, 1980

[86] PCT No.: PCT/CH80/00100

§ 371 Date: May 4, 1981

§ 102(e) Date: May 4, 1981

[87] PCT Pub. No.: WO81/00732

PCT Pub. Date: Mar. 19, 1981

[30] Foreign Application Priority Data

Sep. 3, 1979 [CH] Switzerland ............................ 7952/79

[51] Int. Cl.³ .............................................. E01C 5/00
[52] U.S. Cl. ........................................ 404/40; 52/578; 403/182
[58] Field of Search ......................... 404/40, 41, 35, 56, 404/49, 48, 47, 51; 52/578, 582, 704; 292/241; 403/182

[56] References Cited

U.S. PATENT DOCUMENTS

| 14,736 | 4/1856 | Robinson | 404/40 |
|---|---|---|---|
| 1,660,421 | 2/1928 | Knight | 404/40 |
| 2,588,609 | 3/1952 | Blackhall | 404/56 |
| 2,629,139 | 2/1953 | Thelander | 52/578 |
| 2,672,660 | 3/1954 | Becker | 403/182 |
| 3,175,476 | 3/1965 | Franks | 404/41 X |
| 3,341,233 | 9/1967 | Cushman | 52/578 X |
| 3,379,104 | 4/1968 | Scholl | 404/40 X |
| 4,011,022 | 3/1977 | Welty | 404/40 |
| 4,145,862 | 3/1979 | Sygnator | 52/582 |
| 4,191,489 | 3/1980 | Ray et al. | 404/51 |

Primary Examiner—Nile C. Byers, Jr.

[57] ABSTRACT

Each road surface element (1) has a cut-out portion (3), which is delimited by means of section (4b) of a plate (4). The cut-out portion (3) is traversed by a bolt (6). A locking piece (2), which has two catches (26) on its lower side is inserted into the chamber formed by the cut-out portions of two adjacent elements and is then rotated so that the catches (26) come to rest beneath the bolts (6). The two elements are then locked together and forces are transmitted through the two locking portions and the catches (26) to the bolt (6) and thus from one element to the other. The upper surface of the locking piece (2) is level with the surface of the two elements.

Application more particularly to the production of temporary road surfaces, for example, during road detours or for use in construction excavations.

5 Claims, 8 Drawing Figures

ROAD SURFACE COMPRISING INDIVIDUAL INTERCONNECTED ELEMENTS

The present invention relates to a road surface consisting of single elements that are connected to each other.

Very frequently, on construction sites, for example when a detour has to be built around a main road because of construction work, or to provide access to a construction site on one side of a road, it is often necessary to lay down a temporary road that, after conclusion of the construction work, must be lifted once again. According to scope and primarily to the weight of the traffic that will use this road such temporary surfaces in part are very solidly built, which increases construction costs. In particular, breaking up such a road surface and the restoration of the original state of the ground can entail considerable costs in time and money.

The present invention provides a road surface which is particularly intended for such purposes and which has the advantage that it can be laid very quickly and with minimum cost, and can be removed just as quickly so that it can be reused at another site.

Such a road surface is characterized according to the invention.

Figure 2:
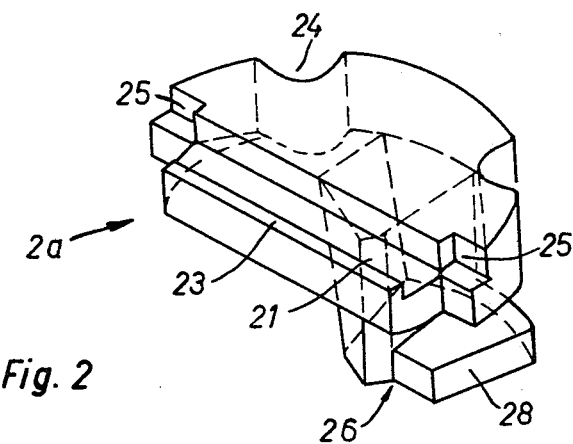
Figure 3:
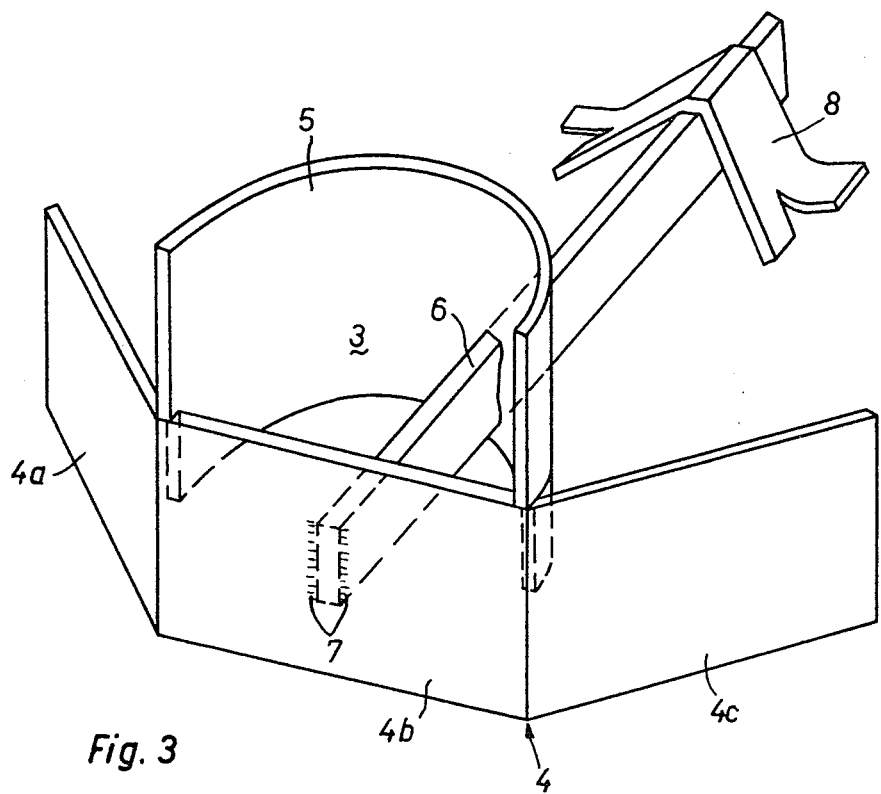
Figure 4:
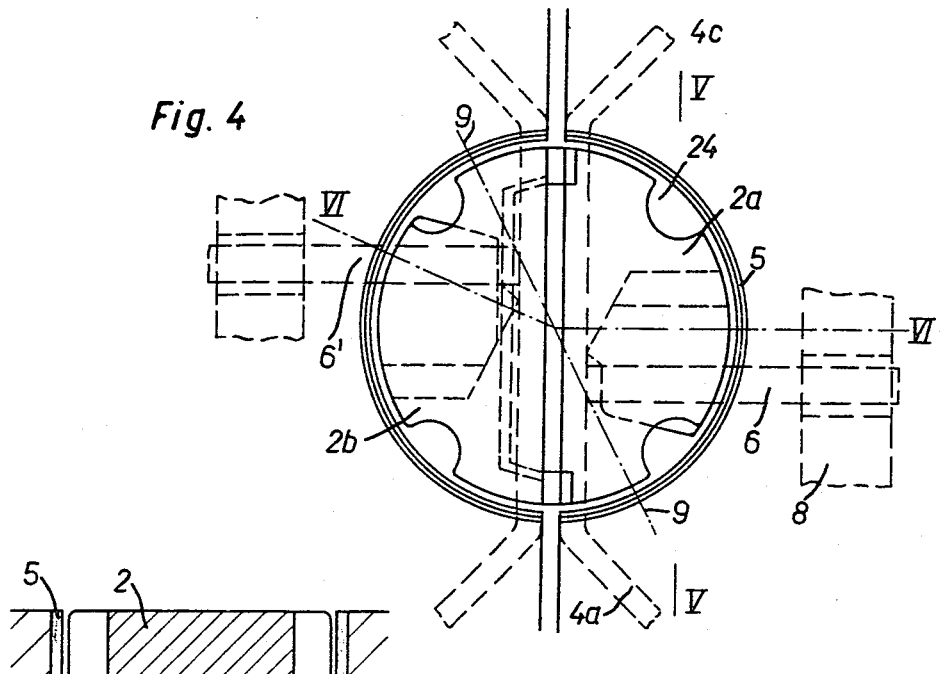
Figure 5:
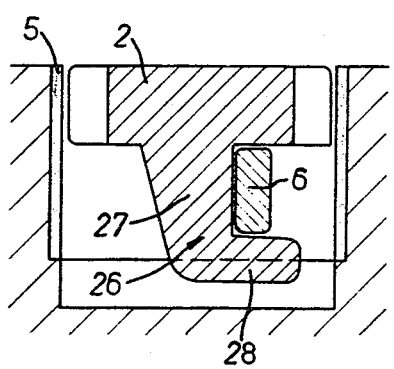
Figure 6:
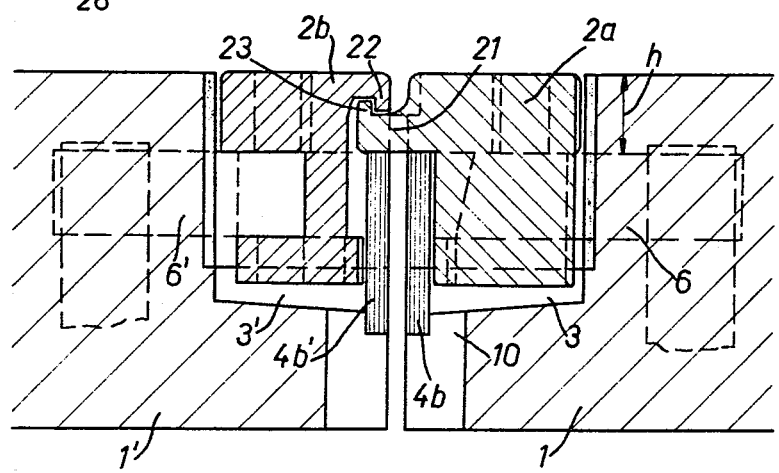

An embodiment of the road surface according to the invention is represented in the drawings, wherein show:

FIG. 1 a perspective exploded view representation of a movable locking piece in its installed position as well as an illustration of an element of the portion which accommodates this locking piece (the connecting element not being shown);

FIG. 2 a perspective view of one half of the locking piece;

FIG. 3 portions of each element which accommodate the locking piece;

FIG. 4 a plan view of two elements interconnected from above;

FIG. 5 a cross-section along line V—V;

FIG. 6 a cross-section along line VI—VI; and

Figure 7A:
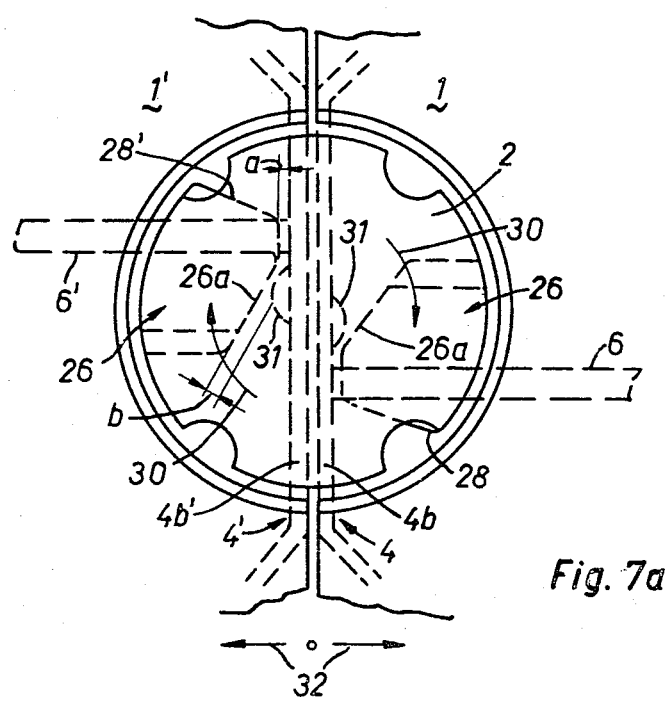
Figure 7B:
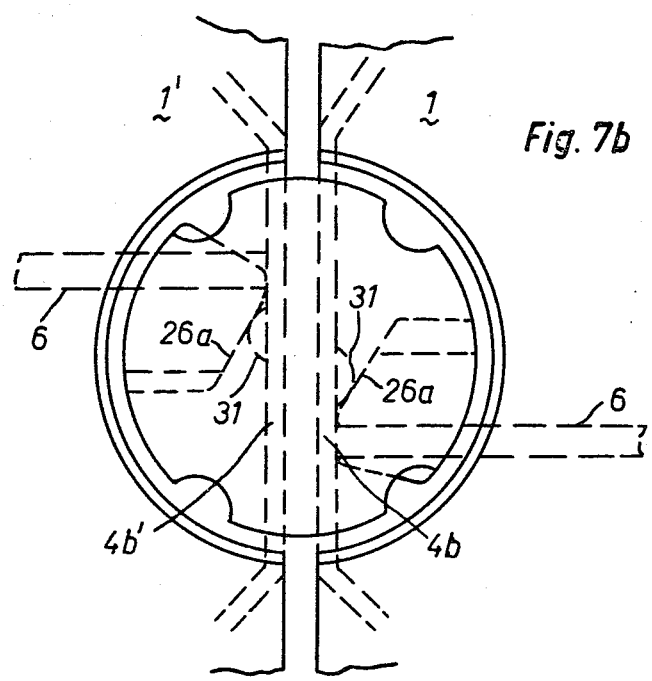

FIGS. 7a, 7b means used for securing the locking piece.

The lower portion of FIG. 1 shows a concrete road surface element 1 which is connected to a second element, particularly with the element 1', which is shown in FIG. 6, by means of the locking piece numbered 2. For this purpose each of these elements 1,1' which are predominantly square or rectangular, has a semi-circular cut-out portion 3,3'', which together forms a chamber to accommodate the locking piece 2. Each cut-out portion is covered by various metal parts, or traversed by them, which, for the sake of clarity, are shown in the same arrangement but without the body portions of the elements in FIG. 3. Here can be seen a vertical plate 4, which consists of three sections 4a, 4b and 4c that are separate and arranged at an angle to each other, in which connection, according to FIG. 1, the centre section 4b limits the semi-circular section 3, however, to only part of its height. On this section 4b there is a semi-circular ring 5 that is so attached that this section 4b constitutes its diameter, as it were. The semi-circular ring 5 protrudes above the upper edge of the section 4b as far as the upper surface of the surface element 1 and rests against the section 4b but has its lower portion set back somewhat so that these lower portions abut against the section 4b and can be welded to it. The semi-circular ring is traversed by an extremely heavy bolt 6 which ends at the section 4b, at right angles to it. This is welded to the section 4b; the welds 7 have been indicated in FIG. 3. Plate 4, the semi-circular ring 5, and the bolt 6 thus form a rigid insert in the element 1 as can be seen particularly in FIG. 3, this bolt 6 is arranged assymetrically to the cut-out portion 3, for reasons which will be explained later. The level of this bolt 6 relative to the plate 4 and the semi-circular ring 5 can be seen particularly clearly in FIG. 6.

At its rear end, that is completely surrounded by the concrete of the element 1, the bolt 6 bears a V-shaped pressure distributing plate 8. The pressure distributing plate 8 distributes the forces on the bolts 6, which in the main, are effective upwards, over a broad area within the element, reducing the strain thereby.

All the parts 4,5,6 and 8 shown in FIG. 3 are preferably made of cast steel and welded to each other, even though only the welds 7 are actually shown.

The road surface element 1 has such cut-out portions 3 together with the associated parts as shown in FIG. 3 wherever it is to be connected to similar elements. Thus, in general, a minimum of one cut-out portion 3 and for each cut-out portion 3 a complement of those parts will be provided on each four side faces so that when the elements are located adjacent to each other these cut-out portions together form the previously discussed chambers 3,3'. The internal radius of the semi-circular ring 5 is dimensioned so that (apart from tolerances) it corresponds to the radius of the circular locking piece 2. According to FIG. 1 and 2 the locking piece consists of two approximately symmetrical semi-circular bodies 2a, 2b. These differ from each other only in the fact that the body 2a shown in FIG. 2 has a groove 21 along the length of its straight side face and this forms a coupling member for an equally long lip 22 on the other part 2b which extends downwards (FIG. 6). As shown in FIG. 6 the groove 21 is considerably wider than the thickness of the lip 22; in addition the lip 22 is set at a distance from the remaining portion of the body 2b that is greater than the thickness of the outer edge 23 of the groove. This means that there is quite a large gap between the two bodies. This means that the two bodies 2a and 2b are arranged as to be inclined towards each other, thus locked to each other, and it serves as a run-off for water. The semi-circular cut-out sections 24 in both bodies serve the same purpose. In addition, these also serve to save weight and to reduce friction when the locking pieces are rotated as will be discussed later. A further minor difference between 2a and 2b can be seen in the face that the body 2a has two square or rectangular cut-out portions 25 (FIG. 1 and FIG. 2) that are arranged approximately diametrically or opposite each other. The purpose of these will be given in subsequent description of the assembly process. Each of the bodies 2a and 2b which form the locking piece has a catch 26, that can be seen in FIGS. 1, 2 and 5, these catches extending downwards from the locking piece and being approximately L-shaped having a vertical arm 27 and a horizontal tooth 28.

The assembly of the elements to form one continuous road surface is very simple. The elements are placed on the ground in which case care has to be taken simply that, first, the cut-out portions 3,3' in adjacent elements are aligned, i.e. the elements are not off-set in relation to each other, and second that the cut-out portions are correctly spaced in relation to each other, that is to say there is a specific gap between them, in order that the locking piece 2 fits properly into the chamber. This can be ensured by measurement or else by using an assembly template. Next, in the case of a two part locking piece, the two sections 2a, 2b are joined to each other by installing the lip 22 in the groove 21 these then being installed as a unit in the chamber. However this insertion is not made as is shown approximately in FIG. 1 (each Figure shows the locking piece in a secured state), but must be done in such a way the groove and the lip form an angle to the assembly gap left between the two elements; in FIG. 4 the sloping position is symbolized by the line 9—9. Thus it is impossible to move the catch 26 downwards past the bolt 6. Thus it can be seen why the bolt 6 is installed assymetrically in the semi-circular ring 5, this leaves more space on one side for the insertion of the catch. If the locking piece is now placed on the two sections 4b,4b' (FIG. 6) of the vertical plates the above tool is inserted into the cut-out portions 25 and the whole lock rotated into the position shown in FIGS. 1 and 4, so that the groove 21 and the lip 22 are parallel to the gap between the two elements. During this rotation the catches 26 engage beneath the bolt 6; rotation is ended when the arms abut against the bolt (FIG. 5). Thus the elements are connected to each other.

The plates 4 are so arranged that their upper edge is located at the level h beneath the surface of the element 1,1' (FIG. 6). The two bodies 2a, 2b together are of a thickness that corresponds exactly to this distance h. Because of this the locking piece and the adjacent elements form a level surface. The gap between the elements and the previously discussed free play between the groove 21 and the lip 22 also ensure that the two elements can be inclined to a considerable extent, i.e. up to 15% relative to each other so that even very steep inclines can be bridged by using these elements. This is of particular advantage where ramps, e.g. for access to excavations, have to be covered using this road surface.

However, in the event that the ground is to all intents and purposes level, instead of a two-part locking piece, it is also possible to use a locking piece that consists of a single body and only the semi-circular portion 24, the cut-outs 25 for the tool and the two catches 26. The cut-out portions 24 then serve as water run-offs; the water runs to the bottom of the chambers 3,3' and from there through a further small cut-out 10 (FIG. 1) to the underlying ground. The locking piece is installed as has been described above.

The road surface also has the following advantages apart from the already discussed advantage of being able to bridge steep inclines:

The interaction of the bolt 6 and the catch 26 ensures that adjacent elements are aligned on the same level even if, prior to being secured, they are at different levels. Thus there is no need to grade the underlying ground; primary levelling will be sufficient.

While the total locking effect takes place in the upper portion of the elements (see in particular FIG. 6) this can be made as deep as desired, i.e. according to permissible demands. In particular, all the elements in the lower portion can be reinforced.

Rapid assembly and disassembly makes it possible to replace a damaged element very quickly without affecting the adjacent elements.

Any irregularities in the elements will be to a very great extent, compensated for by the locking piece.

The plate 4, particularly its visible section 4b, can be used when raising the elements by lifting devices.

Pressure is transmitted from one element to the other. This can be seen particularly from FIG. 6, where it can be seen that the groove 21 and the right hand element 1 rests with their upper sides on the section 4b' of the left hand element 1'. The lip 22 with this element presses across the groove 21 onto the section 4b of the right hand element 1. This also then applies to two elements that are inclined to each other. They will then level each other out until the lock, especially the Part 2a, is installed once again on the two sections 4b,b'. Removal of this road surface is equally simple; the elements can be used repeatedly and can be easily transported. They also take up little room when stored.

FIGS. 7a and 7b show a simple means that can be used to stop the catch 26 turning back beneath the bolt 6,6' in order to prevent the connection of the elements 1,1' from being unintentionally loosened. Such a turning back of the catch can occur under some circumstances if the force acts on at least one element, which has a tendency to pull this element away from the other.

The two figures show the method of operation of this means, in FIG. 7a this is shown after the assembly of the two elements and in FIG. 7b its effect after the displacement of the elements 1,1'. The intention is the same as in FIG. 4, and the same parts (with the exception of part 8) can be seen. However, both these illustrations show a one-part locking piece, so that the points of connection (groove and lip) that can be seen in FIG. 4 numbered 21 and 22 respectively are missing in FIG. 6.

As has been already described, the locking piece is inserted and then rotated in accordance with the two arrows 30 until each catch 26 abuts against the corresponding bolts 6 or 6' respectively; the teeth 28 of the catches now engage beneath the appropriate bolt. Normally each catch, as can be seen in FIG. 7a, is at a small distance from the corresponding section of the plate 4. This distance is shown for the section sector 4b' and the catch that is adjacent to it and is marked with a letter a. There is a projection 31 on section 4b' and 4b and this appears as a semi-circular shape in these illustrations. It is of no consequence for its method of operation whether it is hemi-spherical or semi-cylindrical (with the longitudinal axis vertical to the plane of the illustration) and even a triangular shape could be used. It is only important that each projection 31 is at a slight distance from the side wall 26a of the catch in question which in the left hand half in FIG. 7a is marked with a letter b. This distance is important because the movement of the catch 26 according to the arrows 30 must not be hindered by these projections 31.

If because of use of the road surface, forces are now effective on the elements 1',1 these elements may move apart in the direction of the arrows 32. The distance from each other will be greater than is apparent from a comparison of the two FIGS. 7a and 7b. The sectors 4b' and 4b, together with their projections 31 are also moved with the elements since they are part of these elements 1', 1. The catches 26 which are part of the locking portions 2, will maintain their position. Thus the projections 31 will move towards the side walls 26a. This movement ends when the projection touches the corresponding side wall or when the sections 4'b', 4b all touch or when both the foregoing occur. In each case the distances a and b will disappear. Thus it will be impossible for the catches 26 to be turned back and it will also be possible for the connection to be loosened; the locking piece 2 is secured (FIG. 7b).

The method of operation of the projections 31 and catches that have been described will of course apply in exactly the same way to a two-part locking piece. In this case these projections will be formed in exactly the same way as is described here.

I claim:

1. Road surface formed from individual interconnected elements, whereof each element (1, 1') has in at least one end face at least one semicircular cut-out portion (3, 3') which, together with the corresponding cut-out portion of the adjacent element (1') forms a chamber which receives a substantially cylindrical lock (2), provided with at least two catches (26), each of which interacts with a bolt (6, 6') on each element (1, 1') when the lock is secured, said bolt being anchored in the element and protruding into the cut-out portion (3, 3'), characterized in that the lock comprises one cross-sectionally circular member or two cross-sectionally semi-circular and assembled members (2a, 2b), the radius of said member or members being constant over the entire height of the member, and that each catch (26) comprises a root (27) which projects vertically downwards from the lower face of the member or members (2a, 2b) and a tooth (28) extending horizontally from the lower end thereof, the teeth extending in the same direction along the periphery of the lock (2), the top of each tooth engaging the bottom of the associated bolt (6, 6') which in turn passes below the member (2a, 2b).

2. Road surface according to claim 1, characterized in that lock (2) rests on the tops of two plates (4, 4') each being anchored in the associated element (1, 1') with its central portion (4b, 4b') whose cut-out portion (3, 3') bounds on the face of the element and whose top is positioned below the surface of the element.

3. Road surface according to claim 2, characterized in that the central portion (4b, 4b') of each of the said plates (4, 4') is connected to the bolt (6, 6') which asymmetrically traverses the cut-out portion (3, 3').

4. Road surface according to claim 2, characterized in that a semicircular ring (5, 5') covering part of the height of the cut-out portion wall is adjacent to the ends of the central portion (4b, 4b').

5. Road surface according to one of the preceding claims, characterized in that on each central portion (4b, 4b') of the plate (4) delimiting the cut-out portion (3, 3') on its side remote from the latter there is a projection (31) which, in the event of a displacement of the appropriate element (1, 1') and thus of the central portion (4b, 4b') relative to the lock (2) abuts against the sidewall (26a) of the catch (26) adjacent thereto (31) and blocks the same in the end position.

* * * * *